(12) United States Patent
White

(10) Patent No.: US 8,459,710 B1
(45) Date of Patent: Jun. 11, 2013

(54) MATTRESS CARRIER

(76) Inventor: Terrance J. White, Castaic, CA (US)

( * ) Notice: Subject to any disclaimer, the term of this patent is extended or adjusted under 35 U.S.C. 154(b) by 0 days.

(21) Appl. No.: 13/136,854

(22) Filed: Aug. 12, 2011

Related U.S. Application Data

(60) Provisional application No. 61/401,491, filed on Aug. 13, 2010.

(51) Int. Cl.
*B65G 7/12* (2006.01)
(52) U.S. Cl.
USPC .......................................... 294/152; 294/165
(58) Field of Classification Search
USPC .................... 294/149, 150, 152, 165
See application file for complete search history.

(56) References Cited

U.S. PATENT DOCUMENTS

| | | | |
|---|---|---|---|
| 2,687,321 A * | 8/1954 | Toffolon | 294/74 |
| 3,591,875 A | 7/1971 | Zipf, III et al. | |
| 3,935,690 A | 2/1976 | Lea et al. | |
| 3,939,508 A | 2/1976 | Hall et al. | |
| 4,119,250 A * | 10/1978 | Brutlag | 294/149 |
| 4,232,415 A | 11/1980 | Webber | |
| 4,431,226 A * | 2/1984 | Weilert | 294/150 |
| 4,521,045 A | 6/1985 | Hart | |
| 4,553,780 A * | 11/1985 | Strachan | 294/152 |
| 5,189,746 A * | 3/1993 | Horie | 5/627 |
| 5,860,174 A | 1/1999 | Failor | |
| 6,193,293 B1 * | 2/2001 | Ybanez | 294/152 |
| 7,437,784 B1 * | 10/2008 | Turnipseed | 5/510 |

* cited by examiner

*Primary Examiner* — Dean Kramer
(74) *Attorney, Agent, or Firm* — Mark F. Smith; Smith Brandenburg Ltd.

(57) ABSTRACT

The present invention is a mattress carrier comprising a generally rectangular shaped sling having spaced apart front and back opposed panels, spaced apart end panels, and a bottom end forming an interior cavity having a closed bottom and sides with an open upper portion for receiving a mattress to be transported. A stabilizing strap having a first portion securely attached to the back panel and a second portion securely attached to front panel. A pair of primary handles is fixed to the upper portions of the spaced apart side panels for lifting and carrying the mattress carrier.

1 Claim, 3 Drawing Sheets

MATTRESS CARRIER

CROSS-REFERENCE TO RELATED APPLICATION

The present application claims benefit of U.S. Provisional Patent Application Ser. No. 61/401,491, filed Aug. 13, 2010, the disclosure of which is hereby incorporated by reference in its entirety.

BACKGROUND OF THE INVENTION

The present invention is a mattress carrier and, more particularly, a mattress carrier effective for lifting and transporting various size mattresses.

The transport of mattresses from one location to another is often difficult. Mattresses, particularly large or oversized mattresses, are bulky and cumbersome to handle and typically are flexible requiring the mover to provide both lateral and vertical support. Further, transporting the mattress down stairways or through doorways can result in a mover injuring or straining his/her back or requires the mover to set down the mattress to rest. This can result in the mattress being soiled or damaged.

Mattresses often are provided with handles attached along the periphery of the mattress. Such handles however when used exert force along only a small portion of the material forming the mattress and are not designed for moving or transporting the mattress from one location to another but are provided to allow the mattress to be flipped over on the box spring to increase the life of the mattress.

While various devices have been developed to aid in moving and transporting mattresses from one location to the next, such devices are relatively complicated to use, or are difficult or time consuming to attached to a mattress, or are relatively expensive to manufacture. Accordingly, what is needed is a mattress carrier that is relatively easy to attach to a mattress, which can be used with various sizes of mattresses, prevents or reduces the likelihood of injury to a mover, and is relatively inexpensive to manufacture.

SUMMARY OF THE INVENTION

The present invention is a mattress carrier comprising a generally rectangular shaped sling having spaced apart front and back opposed panels, spaced apart end panels, and a bottom end forming an interior cavity having a closed bottom and sides with an open upper portion for receiving a mattress to be transported. A stabilizing strap having a first portion securely attached to the back panel and a second portion securely attached to front panel. A pair of primary handles is fixed to the upper portions of the spaced apart side panels for lifting and carrying the mattress carrier.

In a preferred embodiment of the invention the sling is formed from a flexible material.

In a preferred embodiment of the invention the sling is formed from a fabric material.

In a preferred embodiment of the invention the sling is formed from a plastic material.

In a preferred embodiment of the invention the sling is formed from cotton or a cotton blend.

In a preferred embodiment of the invention the handles are formed from a flexible material.

In a preferred embodiment the handles are formed from a synthetic material is polypropylene or Nylon webbing.

In another preferred embodiment of the invention the stabilizing strap comprises a first end and a second end include an attachment apparatus for attaching the first portion and the second portion together.

In a preferred embodiment of the invention the attachment apparatus comprises a quick release fastener.

In a preferred embodiment of the invention the mattress carrier includes secondary handles that also operate as flexible strengtheners to provide support the end panels to aid in the inserting of a mattress into the cavity.

These and other benefits, advantages, and embodiments of the invention will be apparent from the following description, the accompanying drawings and the appended claims.

BRIEF DESCRIPTION OF THE DRAWINGS

Features, aspects, and advantages of the present invention will become better understood with regard to the following description, appended claims, and accompanying drawings where:

DETAILED DESCRIPTION OF THE INVENTION

Figure 4:
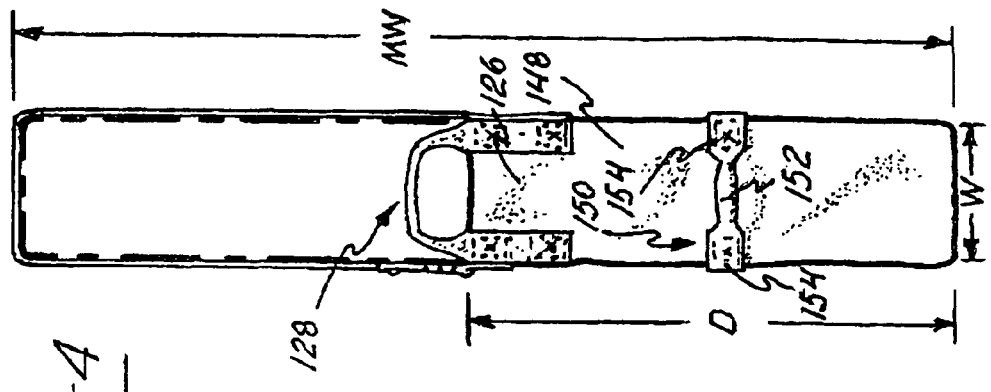
FIG. 4 is a side elevational view of the mattress carrier showing a mattress inserted into the carrier for transport to another location.
Figure 1:
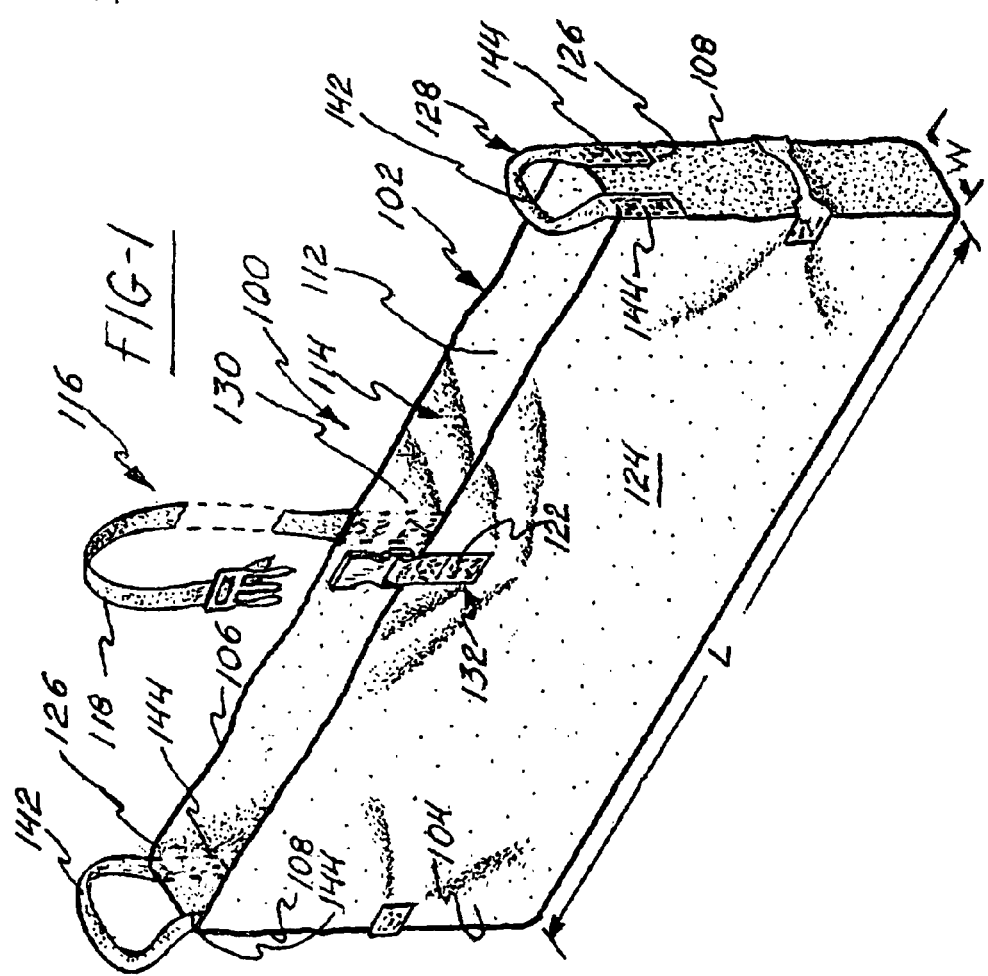
FIG. 1 is a front perspective view of the mattress carrier showing in its open un-folded configuration without a mattress being inserted within the carrier.
Figure 3:
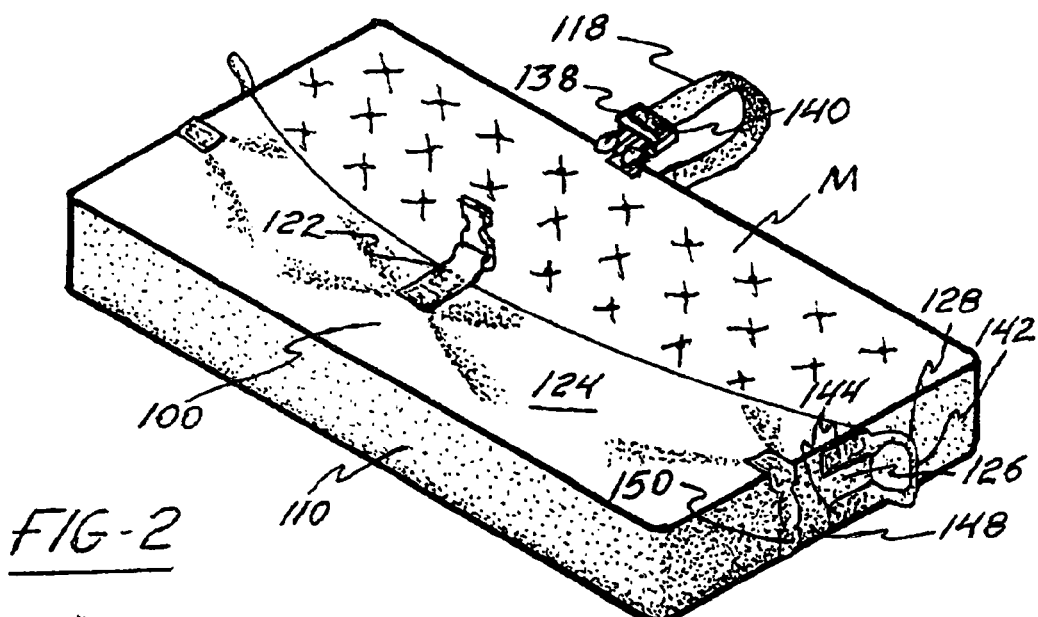
FIG. 3 is a perspective view of the mattress carrier having a mattress being inserted into the carrier and the stabilizing strap being placed around the top portion of the mattress.
Figure 2:
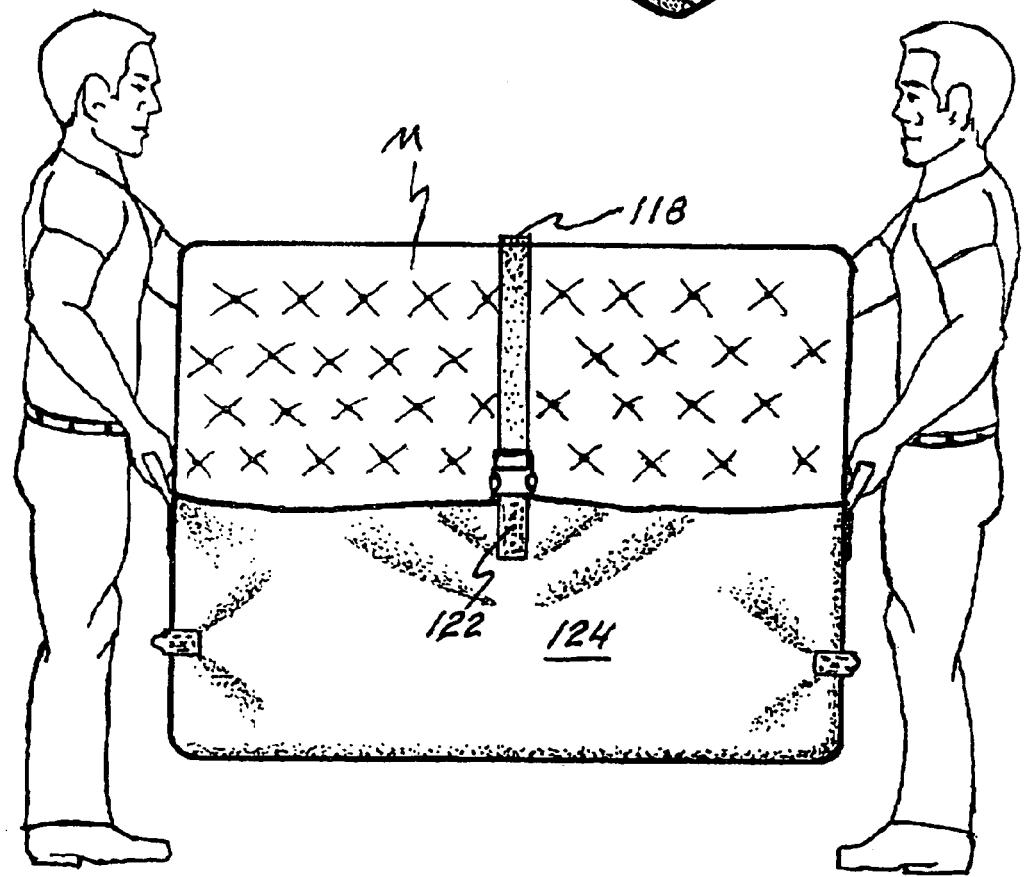
FIG. 2 is a side elevational view of the mattress carrier of FIG. 1 showing a mattress inserted into the mattress carrier and with primary handles being used for lifting the mattress carrier and transporting the mattress to another location.
Figure 5:
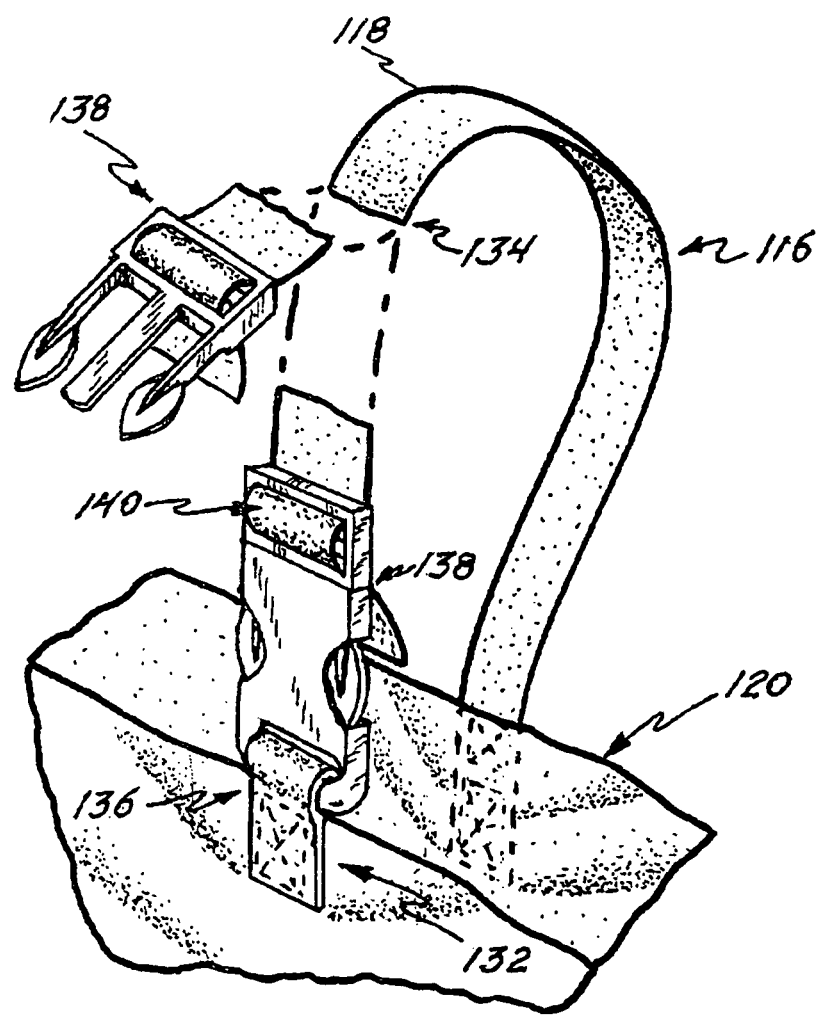
FIG. 5 is a perspective view showing a preferred embodiment of the quick release buckle and adjustment device.

The subject invention is a mattress carrier for use in lifting and transporting a bed mattress from one location to another location. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Referring to the drawings, the mattress carrier 100 of the subject invention is shown comprising a generally rectangular shaped sling or cradle 102 having spaced apart front and back opposed panels 104 and 106 respectively, spaced apart end panels 108, and a bottom end 110 forming an interior cavity 112 having a closed bottom and sides with an open upper portion 114 for receiving a mattress M to be transported. In a preferred embodiment of the invention the sling 100 is formed from a relatively high quality, high strength flexible material, such as, but not limited to, a plastic or a woven fabric, such as cotton or cotton blend. In another preferred embodiment of the invention the sling is reinforced such as, but not limited to, along the bottom end or along the periphery of the panels, thereby increasing the strength and reducing the likelihood of rips or tears. Such reinforcement can include the use of additional layers of the flexible material or the use of other conventional materials used for strengthening fabric formed carrying articles.

A stabilizing strap 116 having a first portion 118 attached to the midpoint along the top periphery of the outer face 120 of the back panel 106 and a second portion 122 attached to the midpoint along the top periphery of the outer face 124 of the front panel 104. A carrying strap is fixed to the upper portion 126 of each end panel 108 forming primary handles 128.

In a preferred embodiment, the inner end 130 of the first portion 118 of the stabilizing strap 116 and the inner end 132 of the second portion 122 of the stabilizing strap 116 are securely attached by means of sewing to the top portion of the outer face 120 of the back panel 106 and the outer face 124 of the front panel 104, respectively. It should be understood that the stabilizing strap 116 can be securely attached to the front panel 104 and the back panel 106 by other suitable means such as by rivets, studs and other like means. In another preferred embodiment of the invention, the stabilizing strap 116 is securely attached to the front panel 104 and the back panel 106 by detachable apparatus such as snaps, Velcro or other such means. In a preferred embodiment of the invention, the outer end 134 of the first portion 118 of the stabilizing strap 116 and the outer end 136 of the second portion 122 of the stabilizing strap 116 are provided with a quick release buckle 138 for removably attaching the first portion 118 and the second portion 122 of the stabilizing strap 116 together. As shown the quick release buckle is provided with an adjustment device 140 for allowing a mover to lengthen or shorten the length of the stabilizing strap 116.

As shown, each spaced apart end panel 108 is provided with a primary handle 128. In a preferred embodiment the primary handles 128 are formed from a webbed material, such as nylon. The middle portions 142 of each primary handle 128 are folded in half to provide additional support strength to the handle as well as to add to the overall comfort when the handles grasped and the sling 102 is lifted to transport the mattress. The ends 144 of each primary handle 128 are securely attached, such as by sewing, to the longitudinal upper portions 126 of the outer surfaces 148 of each end panel 108. It should be understood that the primary handles 128 can also be securely attached to each end panel 108 by other suitable means such as by rivets, studs and other like means.

In a preferred embodiment, each spaced apart end panel 108 further comprises a secondary handle 150 positioned longitudinally lower (closer to the bottom end 110) than the corresponding primary handle 128. As shown, the secondary handles 150 are positioned generally parallel to the width W of the sling 102 to provide increased stability to the sling 102 during the transport of a mattress. It should also now be apparent to one skilled in the art that the secondary handles 150 may be beneficial to movers that are short in height or may be used by a user together with a primary handle 128 to facilitate transport. The middle portions 152 of each secondary handle 150 are folded in half to provide additional support strength to the handle 150 as well as to add to the overall comfort when the handles 150 grasped and the sling 102 is lifted to transport the mattress. The ends 154 of each secondary handle 150 are securely attached, such as by sewing, to the outer surfaces 148 of each end panel 108. It should be understood that the secondary handles 150 can also be securely attached to each end panel 108 by other suitable means such as by rivets, studs and other like means.

In order to better understand how the mattress carrier 100 and the various components cooperate and work together, the following exemplary illustration of the general overall operation of the mattress carrier of the subject invention is provided. As shown a mattress M for transport is positioned such that the mattress carrier 100 can be placed so that the mattress M can be inserted into the inner cavity 112 of the sling 102. The cavity 112 is of sufficient length L and width W such that a portion of the mattress M can be inserted into the cavity 112. Preferably, as shown, the depth D of the cavity 112 is sufficient for allowing at least half of the width of the mattress MW to be inserted within the cavity 112 thereby increasing the stability of the mattress and mattress carrier during transport. It should be understood that the dimensions of the mattress carrier 100 are sufficient to accommodate a conventional king size mattress thereby being sufficient to accommodate other conventional sizes such as queen and twin size mattresses. After the mattress M has been inserted into the cavity 112, the stabilizing strap 116 can then be placed around the top of the mattress, as shown, and the first portion 118 of the stabilizing strap 116 is attached to the second portion 122 of the stabilizing strap 116 by use of the quick release buckle 138. The stabilizing strap 116 can then be adjusted using the adjustment device 140 to tighten the strap 116 around the top portion of the mattress M.

It should now be apparent to one skilled in the art that the present invention is a new and novel mattress carrier for transporting a mattress from one location to another. It should also now be apparent that while various devices have been developed to aid in moving and transporting mattresses from one location to the next, the mattress carrier of the subject invention is relatively simple to use, takes little time to a mattress, and is relatively inexpensive to manufacture. It should also be apparent that the mattress carrier can be used with various sizes of mattresses, prevents or reduces the likelihood of injury to a mover, and is relatively inexpensive to manufacture.

Although the foregoing invention has been described in some detail for purposes of clarity of understanding, it should be apparent that certain changes and modifications may be practiced within the scope of the appended claims. Accordingly, the present embodiments and examples are to be considered as illustrative and not restrictive, and the invention is not to be limited to the details given herein, but may be modified within the scope and equivalents of the appended claims.

I claim:

1. A mattress carrier comprising:
   a generally rectangular shaped sling having spaced apart front and back opposed panels, spaced apart end panels, and a bottom end forming an interior cavity for receiving a mattress to be transported;
   a stabilizing strap having a first portion attached to the top periphery of the outer face of said back panel and a second portion attached along the top periphery of the outer face of said front panel and adapted for being positioned over the mattress to be transported and secured to said spaced apart front and back opposed panels;
   a primary handle fixed to each upper portion of each said spaced apart end panels; and
   a pair of secondary handles fixed to spaced apart front and back opposed panels and positioned below said primary handle;
   wherein said sling is formed essentially of a flexible material.

* * * * *